No. 851,447. PATENTED APR. 23, 1907.
A. SIMPSON.
VALVE.
APPLICATION FILED FEB. 5, 1906.
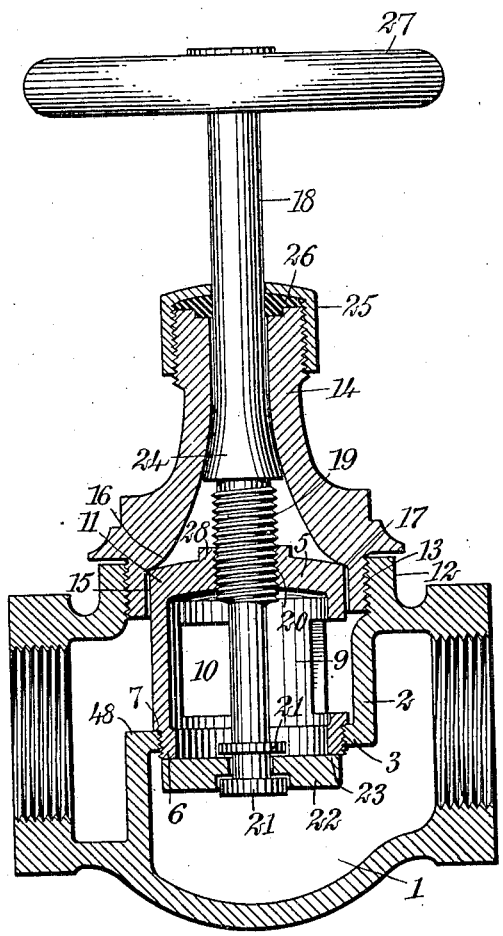
WITNESSES
INVENTOR
Alexander Simpson
BY
ATTORNEYS

UNITED STATES PATENT OFFICE.

ALEXANDER SIMPSON, OF NEW YORK, N. Y.

VALVE.

No. 851,447.　　　Specification of Letters Patent.　　　Patented April 23, 1907.

Application filed February 5, 1906. Serial No. 299,477.

*To all whom it may concern:*

Be it known that I, ALEXANDER SIMPSON, a citizen of the United States, and a resident of the city of New York, borough of the Bronx, in the county and State of New York, have invented a new and Improved Valve, of which the following is a full, clear, and exact description.

This invention relates to valves such as used in pipe systems. The valve is intended to be used for water, steam, gas or other fluids.

The object of the invention is to produce a valve of simple construction which will be well adapted to maintain heavy pressures and which will reduce tendency to leakage.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

The figure is a vertical central section through a valve constructed according to my invention.

Referring more particularly to the parts, 1 represents the body of the valve, which may be that of a globe valve as shown, the said body representing the usual diagonal web 2 with a central extension 3 or web seat. In this seat 3, I form a threaded opening into which is screwed a plug 5 having a reduced threaded nipple 6 for this purpose. By forming the nipple 6 of reduced diameter, an annular shoulder 7 is presented which seats against the upper face of the web seat 3 as shown. This plug 5 is of substantially cylindrical form, the lower extremity thereof being open to permit the fluid to pass. The circumferential wall 9 of the plug is formed with a plurality of openings 10 through which the fluid may flow in passing through the valve. The upper extremity of the plug 5 is formed into a head 11 which is preferably slightly crowned as indicated. The upper side of the body 1 is formed into an annular boss 12 which is internally threaded as at 13 to facilitate the attachment of a bonnet 14 which screws down into and upon the body in a well known manner. The lower extremity of said bonnet is formed with a counter bore 15 in which the upper extremity of the plug 5 is received as indicated, and beyond this counter bore 15 the bonnet is formed with a tapered bore 16 in such a manner that an annular shoulder 17 is formed which lies adjacent to the outer edge of the head 11 of the plug, as indicated. Through the head 11 passes the stem 18 of the valve, the said stem being provided with threads 19; these threads 19 engage with a vertical threaded opening 20 and the stem passes downwardly through the plug, projecting beyond the lower extremity thereof, as indicated. At the lower extremity of the stem are formed collars 21 between which a disk 22 is rotatably attached to the stem as indicated. This disk is adapted to come against the lower extremity 23 of the plug 5, so that this part of the plug constitutes a seat for the valve disk.

The upper portion of the stem 18 which lies within the bonnet 14 is preferably tapered as indicated at 24 so as to conform to the general shape of the tapered bore 16 of the bonnet, as shown. The upper extremity of the bonnet is closed by a stuffing-box nut 25 secured over annular packing 26. To the upper extremity of the stem 18 is a suitable hand wheel 27 attached which enables the stem to be rotated. In order to enable the plug 5 to be screwed into the threaded opening in the web seat 3, the head 11 thereof is preferably formed with a hexagon or similar angular boss 28, and the threads in said opening are preferably of an opposite character to the threads 19; thus, if the thread at one point is right-hand, the thread at the other point will be left-hand.

In the drawing the valve is represented as closed, the valve disk 22 being seated on the lower extremity of the plug. When in this position, the disk evidently effectually closes the opening through the plug and the web. By rotating the hand wheel 27 in the proper direction, the valve stem 18 will advance downwardly so that the disk 22 will become removed from the plug. In this way communication is opened through the lower end of the plug into the interior thereof and through the wall of the plug by reason of the openings 10. When the bonnet 14 is screwed into position, the shoulder 17 seats upon the edge of the plug as indicated, so that at the head of the plug, the surfaces of the head and bonnet come closely in contact; in this way passage of the fluid from the interior of the valve into the interior of the bonnet is effectually prevented. From this arrangement there is no necessity for providing very efficient means for packing the upper portion of the stem at the stuffing-box nut 25. The tight closing of the valve disk upon its seat 23 is enhanced by the swivel connection with which the disk is attached to the stem 18 between the collars 21.

The valve is preferably arranged in a pipe system so that the pressure is maintained upon the under side of the valve disk 22. Some of this pressure is supported at the upper end of the plug by the bonnet 14. In this way the plug operates as a substantial reinforcement for the web 2. On this account, a valve of this construction can operate to support an unusually high pressure with perfect safety. When the bonnet 14 is jammed or seated tightly upon the plug as described, the upward pressure of the plug on the bonnet produces an increased pressure between the threads at the point 13 so that these threads tend to prevent any leakage of the fluid at this part.

Having thus described my invention, I claim as new and desire to secure by Letters Patent,—

In a valve, in combination, a body having a transverse web with a threaded opening therein, a plug mounted in said threaded opening and adapted to pass water through said web, said plug having a head at the upper portion thereof, said head having a threaded opening therethrough, a stem having a threaded engagement with said head and extending below said plug, a swivel disk carried by said stem below said plug, and a bonnet mounted on said body and having an internal annular shoulder seating upon the head of said plug, said bonnet further having a tapered bore above said shoulder, said stem having an enlarged tapered upper portion above said thread and seating in said tapered bore.

In testimony whereof I have signed my name to this specification in the presence of two subscribing witnesses.

ALEXANDER SIMPSON.

Witnesses:
F. D. AMMEN,
JNO. M. RITTER.